US009338651B2

(12) United States Patent
Tatavarty et al.

(10) Patent No.: US 9,338,651 B2
(45) Date of Patent: May 10, 2016

(54) PROACTIVE ASSISTANCE IN OBTAINING A WIRELESS NETWORK CONNECTION

(71) Applicant: Verizon Patent and Licensing Inc., Arlington, VA (US)

(72) Inventors: Srinivas Tatavarty, Irving, TX (US); Srikant Atmakuri, Berhampur (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 74 days.

(21) Appl. No.: 14/274,277

(22) Filed: May 9, 2014

(65) Prior Publication Data
US 2015/0327062 A1  Nov. 12, 2015

(51) Int. Cl.
*H04W 12/06* (2009.01)
*G06F 21/45* (2013.01)
*G06F 7/04* (2006.01)

(52) U.S. Cl.
CPC .............. *H04W 12/06* (2013.01); *G06F 21/45* (2013.01)

(58) Field of Classification Search
CPC ........ H04W 12/06; G06F 21/30; G06F 21/31; G06F 21/45; G06F 2221/2131; H04L 63/083; H04L 63/0838
See application file for complete search history.

(56) References Cited

U.S. PATENT DOCUMENTS

| | | | | |
|---|---|---|---|---|
| 7,263,076 B1* | 8/2007 | Leibovitz | ................ | H04L 63/10 370/310 |
| 8,973,113 B1* | 3/2015 | Eatough | .................. | G06F 21/00 726/6 |
| 2003/0208683 A1* | 11/2003 | Johnson | ................... | G06F 21/31 713/183 |
| 2003/0233450 A1* | 12/2003 | Carley | .................... | H04L 63/08 709/224 |
| 2004/0205201 A1* | 10/2004 | Katsube | .............. | H04L 41/0803 709/229 |
| 2005/0048953 A1* | 3/2005 | Ohara | ................. | H04L 12/2697 455/412.1 |
| 2005/0198534 A1* | 9/2005 | Matta | ...................... | G06F 21/31 726/5 |
| 2007/0174901 A1* | 7/2007 | Chang | ................... | H04W 12/06 726/5 |
| 2010/0058446 A1* | 3/2010 | Thwaites | .............. | G06F 21/604 726/4 |
| 2011/0072493 A1* | 3/2011 | Morishita | ........... | H04L 63/0853 726/3 |
| 2012/0005747 A1* | 1/2012 | Tribble | .................... | G06F 21/34 726/18 |
| 2012/0317224 A1* | 12/2012 | Caldwell | ............... | H04W 24/00 709/217 |
| 2013/0091585 A1* | 4/2013 | Dumais | ................. | H04L 63/126 726/27 |
| 2013/0107806 A1* | 5/2013 | Lee | ....................... | H04W 48/14 370/328 |
| 2013/0318587 A1* | 11/2013 | Shamsspoor | ....... | H04L 63/0838 726/7 |
| 2015/0223068 A1* | 8/2015 | Thelen | .................. | H04L 63/083 726/7 |

* cited by examiner

*Primary Examiner* — Darren B Schwartz

(57) ABSTRACT

A user may be proactively identified as needing assistance to access a home wireless network. Assistance may be automatically provided through, for example, a text message, email, or telephone call. In one implementation, a method may include monitoring a wireless access point that provides a wireless network; obtaining, based on the monitoring, an indication of a failed attempt to attach to the wireless network due to entry of an incorrect network password; and causing, based on the obtained indication of the failed attempt to attach to the wireless network, transmission of a correct password for the wireless network to a mobile device corresponding to an account associated with the wireless network.

20 Claims, 10 Drawing Sheets

300 →

| Customer ID | Network Credentials | Preferred Assistance Technology | Assistance Data |
|---|---|---|---|
| ↑ 310 | ↑ 320 | ↑ 330 | ↑ 340 |
| FA-80-32-11-23-7B | password = green101 | SMS | 703 555 1010 |
| FC-81-00-22-44-9E | password = a32G7111 | SMS | 512 555 0808 |
| jsmith | password = a32G7111 | telephone, email | 512 555 1207 jsmith@example.com |
| ⋮ | ⋮ | ⋮ | ⋮ |

Fig. 3

PROACTIVE ASSISTANCE IN OBTAINING A WIRELESS NETWORK CONNECTION

BACKGROUND

Wireless networks, such as Wi-Fi wireless networks, can provide a relatively easily and flexible technique for providing network connectivity to computing devices. Security for wireless networks can be important, as wireless network traffic over open air connections may be particularly susceptible to interception by malicious entities.

Wireless networks may include a number of mechanisms to secure access to the wireless networks. One technique involves the use of a pre-shared key or password that is used to secure network traffic. With a pre-shared key, a user that attempts to join a particular wireless network may be prompted to enter the key corresponding to the wireless network.

BRIEF DESCRIPTION OF THE DRAWINGS

FIG. 3 is a diagram illustrating a data structure that may be maintained by a Wi-Fi assistance server;

DETAILED DESCRIPTION OF PREFERRED EMBODIMENTS

The following detailed description refers to the accompanying drawings. The same reference numbers in different drawings may identify the same or similar elements.

Techniques described herein may proactively identify when users, such as users of a home wireless network, are likely to need assistance in obtaining access to the home wireless network. Assistance may be automatically provided through, for example, a text message, an email, or telephone call.

Figure 1A:
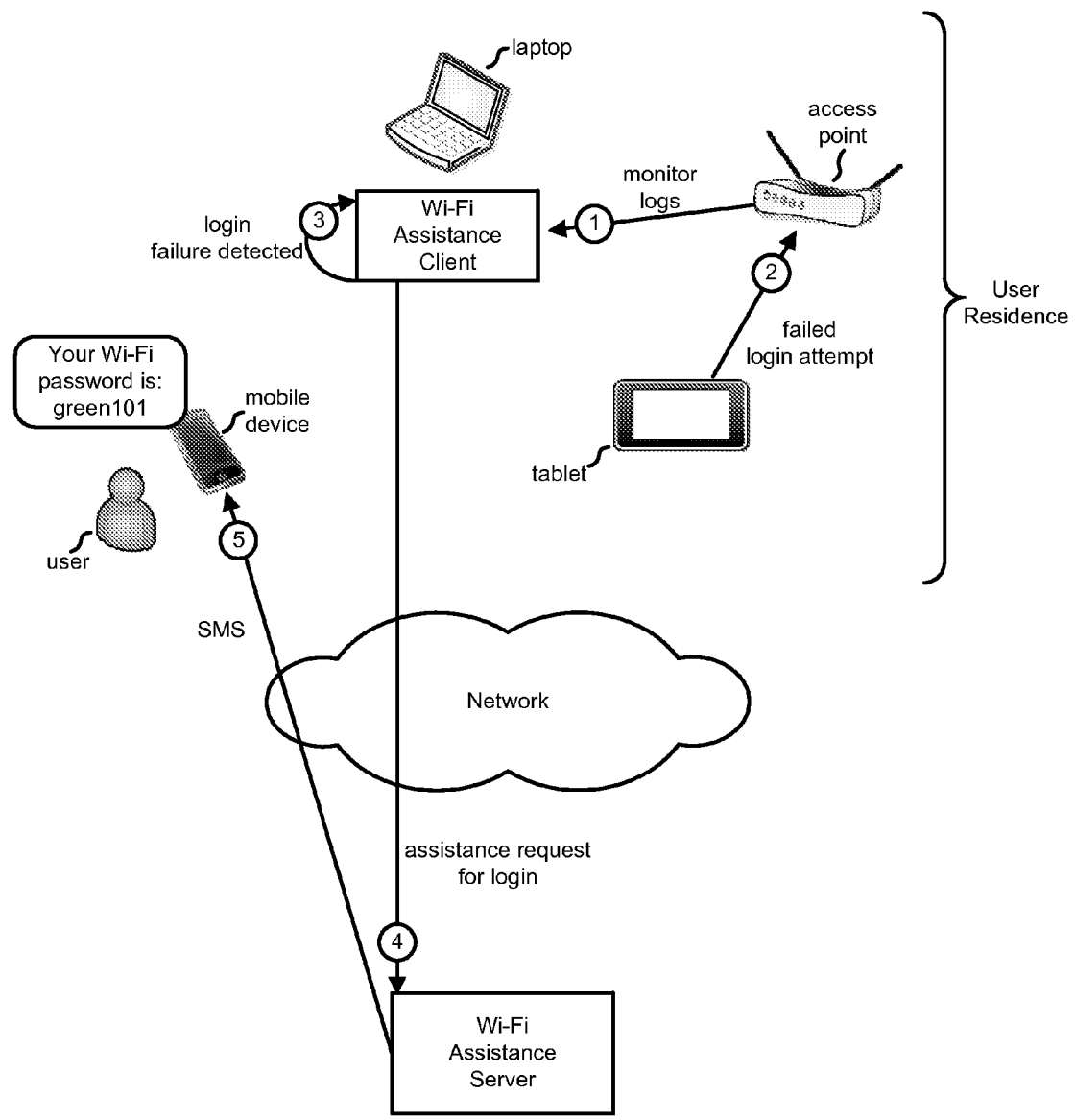
FIGS. 1A and 1B are diagrams illustrating an example of an overview of concepts described herein.

FIG. 1A is diagram illustrating an example of an overview of concepts described herein. As illustrated, assume that a user residence, such as a residential residence, is provided with telecommunication services (e.g., by telecommunications provider), that include network (e.g., Internet) connectivity. The user residence may include a number of communication devices, such as a mobile device (e.g., a smart phone), a laptop, a tablet computer, and an access point. The access point may function to provide a wireless local network, such as via Wi-Fi, to the other communication devices. The access point may enable security for the wireless network using the Wired Equivalent Privacy (WEP) or Wi-Fi Protected Access (WPA) standards. A communication device that wishes to join a wireless network protected with WEP or WPA may be required to enter a password that corresponds to the particular wireless network. Users may potentially forget or not be able to locate the password for their network. As a result, a significant portion of helpdesk calls to the telecommunications provider, that provides network connectivity for the user residence, may include calls from users that cannot connect devices to the wireless networks due to a lost or unknown network password.

In the example implementation of FIG. 1A, the computing device associated with the user's residence, such as the laptop, may run a "Wi-Fi assistance client." The Wi-Fi assistance client may be a program, provided by a telecommunications provider, that operates to monitor the state of the access point. In particular, the Wi-Fi assistance client may monitor logs, such as error logs, generated by the access point. For example, the Wi-Fi assistance client may log in to the access point via an Application Programming Interface (API) supported by the access point or through a hyper-text transfer protocol (HTTP) interface provided by the access point. The Wi-Fi assistance client may thus be able to obtain and monitor operational logs generated by the access point (arrow "1", "monitor logs".)

Further, in FIG. 1A, assume that the mobile device and the laptop are connected to the Wi-Fi network, associated with the user residence, via the access point. Further, assume that the user would like to connect the tablet with the wireless network. The user may navigate to a networking menu, associated with the tablet, but may be unable to remember or may not know the password. The user may thus enter an incorrect password (or no password) at the network connection menu displayed by the tablet (arrow "2", "failed login attempt").

The Wi-Fi assistance client may detect, based on analysis of the access point logs, login failures of users trying to connect to the wireless network. For example, the failure of the tablet to connect to the wireless network may be detected (arrow "3", "login failure detected"). In response, the Wi-Fi assistance client may assist the user in connecting to the wireless network. For example, as illustrated, the Wi-Fi assistance client may transmit a message to a remote Wi-Fi assistance server (arrow "4," "assistance request for login").

In one implementation, the Wi-Fi assistance server may be a server operated by a telecommunications provider that provides network connectivity to the user residence. The Wi-Fi assistance server may store information that can be used to assist the user in resolving network connectivity problems. For example, the Wi-Fi assistance server may store the password associated with the wireless network of the user residence.

The Wi-Fi assistance server, based on the assistance request relating to login of the tablet, may transmit the network password to the user. The network password may be transmitted using a number of possible techniques. For example, as illustrated, a Short Message Service (SMS) text message may be transmitted to the user (arrow "5," "SMS"). The text SMS message may be displayed by the mobile device and may include an indication of the user's password. As illustrated, in this example the message is: "Your Wi-Fi password is: green101." In this manner, the user may be proactively reminded of the Wi-Fi password corresponding to the user's wireless network. Advantageously, the user may not need to call customer service, and the telecommunications provider may save resources by not needing to handle the potential helpdesk call relating to the user's inability to log in to the wireless network.

Figure 1B:
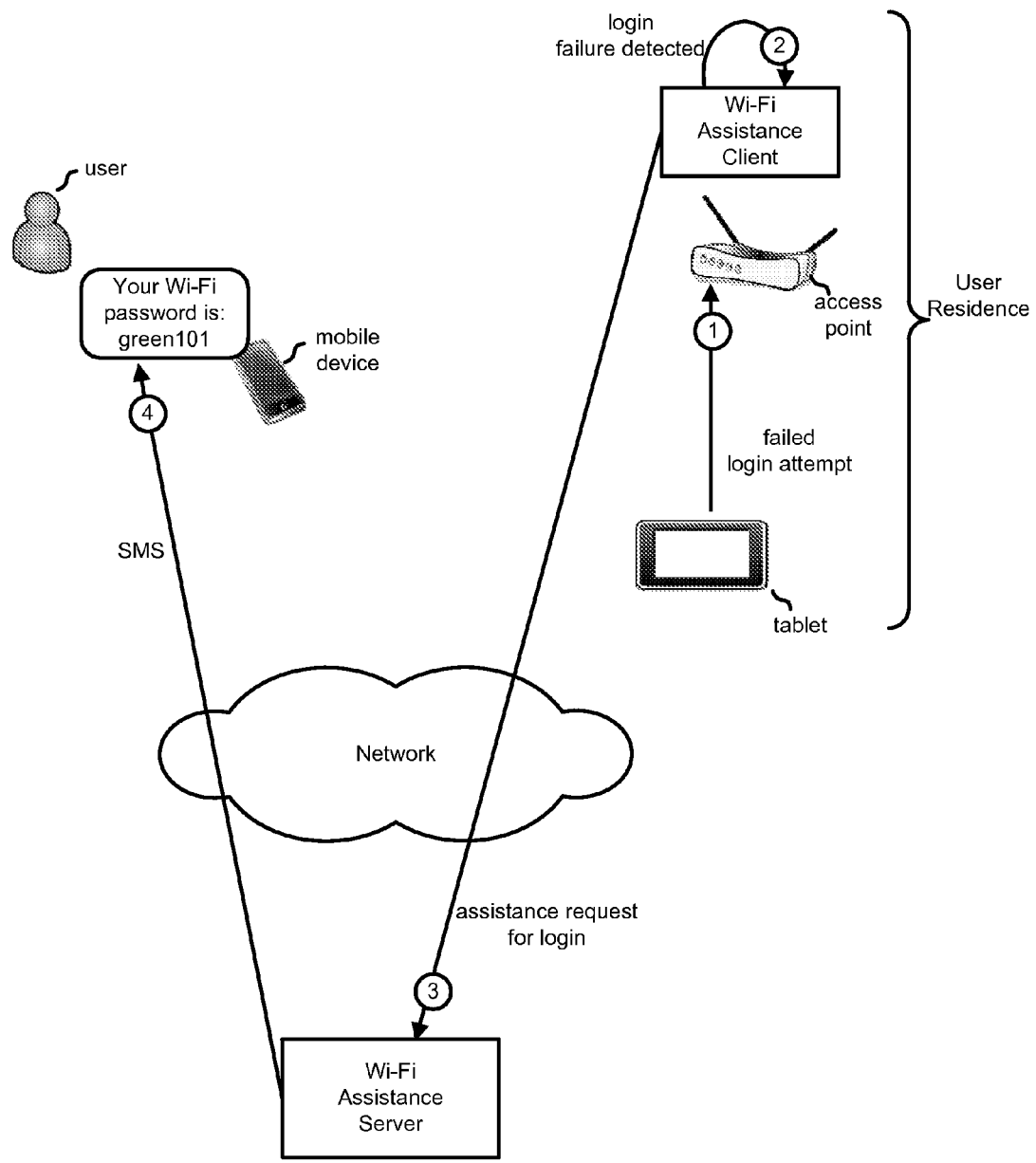

FIG. 1B is a diagram illustrating an example of an overview of concepts described herein, consistent with another aspect. The system of FIG. 1B, as illustrated, may be generally similar to that illustrated in FIG. 1A. In FIG. 1B, however, the Wi-Fi assistance client, instead of executing on a computing device external to the access point, may be implemented within the access point (e.g., as an application, operating system level process, or firmware process implemented as part of the access point).

In FIG. 1B, assume that the user would like to connect the tablet with the wireless network. The user may navigate to a networking menu, associated with the tablet, but may be unable to remember or may not know the password. The user may thus enter an incorrect password (or no password) at the network connection menu displayed by the tablet (arrow "1", "login failure attempt").

The Wi-Fi assistance client, executing at the access point, may detect the failures of the user trying to connect the tablet to the wireless network. For example, the failure of the tablet to connect to the wireless network may be detected (arrow "2", "failed login attempt"). In response, the Wi-Fi assistance client may assist the user in connecting to the wireless network. For example, as illustrated, the Wi-Fi assistance client may transmit a message to a remote server (arrow "3," "assistance request for login").

In response to the assistance request, the Wi-Fi assistance server may transmit the network password to the user (arrow "4," "SMS"). The network password may be transmitted as a SMS text message that may be displayed by the mobile device and may include an indication of the user's password. In this manner, as with the implementation of FIG. 1A, the user may be proactively reminded of the Wi-Fi password corresponding to the user's wireless network.

Figure 2:
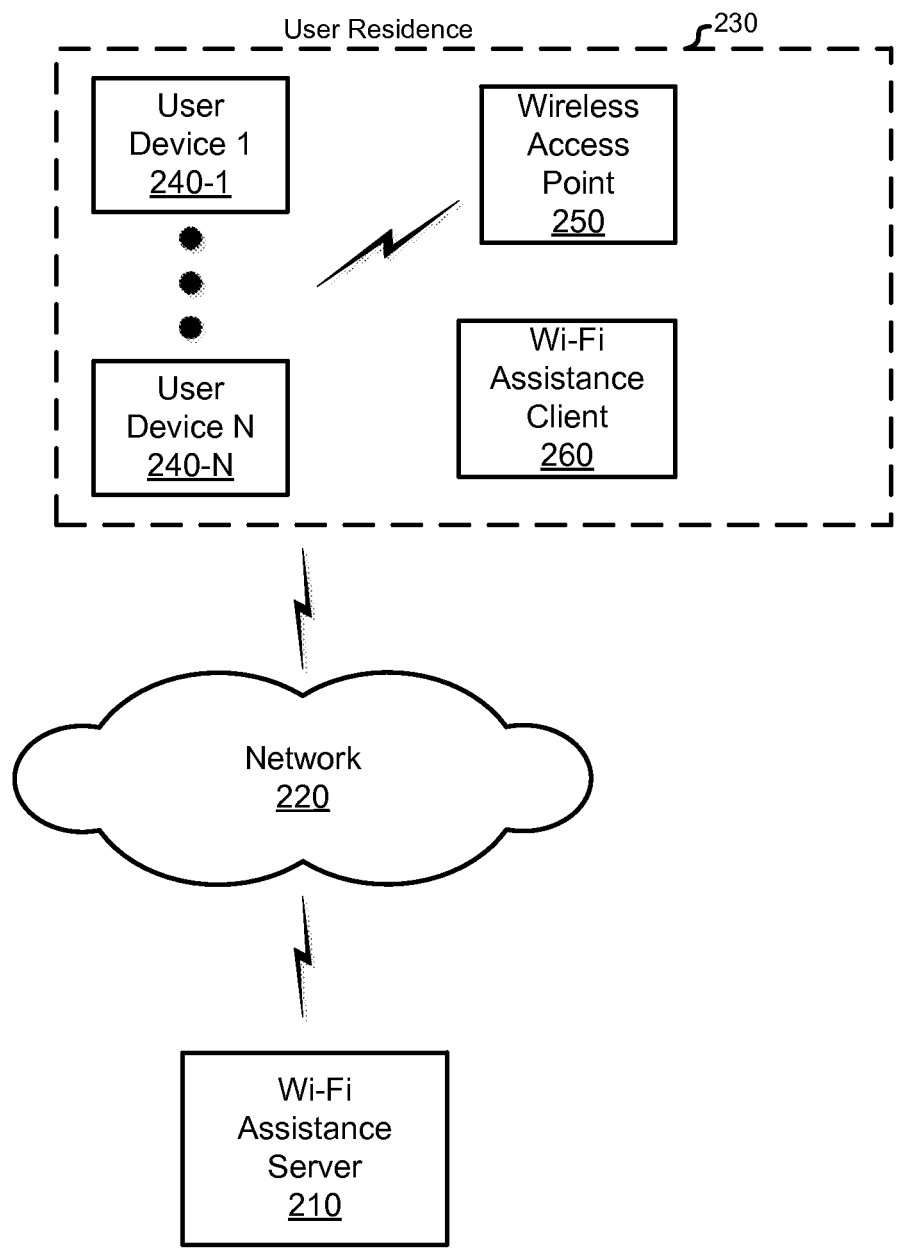
FIG. 2 is a diagram of an example environment in which systems and/or methods described herein may be implemented.

FIG. 2 is a diagram of an example environment 200, in which systems and/or methods described herein may be implemented. As shown in FIG. 2, environment 200 may include Wi-Fi assistance server 210, network 220, and user residence 230.

Wi-Fi assistance server 210 may include one or more computing devices, such as a server device or a collection of server devices. Wi-Fi assistance server 210 may operate to transmit messages to communication devices, associated with user residences 230, to assist users in obtaining connectivity to wireless networks (e.g., Wi-Fi based networks). Wi-Fi assistance server 210 may store identification information relating to various user residences 230, network connectivity information (e.g., passwords) relating to wireless connectivity at the various user residences 230, and/or other information. Wi-Fi assistance server 210 may, in response to requests from devices, such as devices associated with user residence 230, may transmit log in assistance information, such as a Wi-Fi password, to communication devices associated with user residence 230.

Network 220 may include one or more wired and/or wireless networks. For example, network 220 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 240 may include a local area network (LAN), a wireless LAN (WLAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

User residence 230 may include a residence associated with a customer of a telecommunications provider that provides telecommunications services to user residence 230. The telecommunications services may include network connectivity, such as Internet network connectivity. In some implementations, the telecommunications provider may also provide other telecommunication services to user residence 230. For example, a telecommunications provider may provide television services, cellular telephone services, traditional wired telephone services, and/or other services.

As particularly illustrated in FIG. 2, user residence 230 may include user devices 240-1 through 240-N (where N is greater than or equal to one), wireless access point 250, and Wi-Fi assistance client 260. Wi-Fi assistance client 260, although conceptually illustrated as being separate from user devices 240 and wireless access point 250, may be implemented by or as part of wireless access point 250 and/or one or more of user devices 240.

User devices 240 (hereinafter sometimes referred to individually as "user device 240" and collectively as "user devices 240") may each include computing and communication devices. For example, a particular user device 240 may correspond to a mobile communication device (e.g., a smart phone or a personal digital assistant (PDA)), a portable computer device (e.g., a laptop or a tablet computer), a gaming device, a desktop computer device, a television set-top box (STB), or another type of device. In one implementation, at least some of user devices 240 may include wireless adapters that enable user devices 240 to connect to short range wireless networks, such as wireless networks based on the IEEE 802.11-family of standards (commonly referred to as "Wi-Fi"). Wi-Fi connectivity may be obtained, for example, through wireless access point 250.

Wireless access point 250 may include a device that allows wireless devices to connect to a wired network using Wi-Fi or a different standard. In some implementations, wireless access point 250 may include a router. In this case, wireless access point 250 may commonly be referred to as a wireless router. Wireless access point 250 may provide connectivity to network 220. Thus, wireless access point 250 may wirelessly receive communications from user devices 240 and may forward the communications, via a wired or wireless link, to network 220. Wireless access point 250 may maintain operational logs relating to network access attempts (or to other actions) by user devices 240.

Wi-Fi assistance client 260 may detect network connectivity issues, such as problems associated with user devices 240 in attaching to the Wi-Fi network provided by wireless access point 250. As previously mentioned, in one implementation, Wi-Fi assistance client 260 may detect problems relating to incorrect entry of a password or shared key, at one of user devices 240, when user device 240 tries to access the Wi-Fi network. In response, Wi-Fi assistance client 260 may initiate the providing of assistance (e.g., the Wi-Fi password) to one or more user devices 240 associated with user residence 230. Wi-Fi assistance client 260 may include software that is executed at one of user devices 240. In some implementations, Wi-Fi assistance client 260 may be implemented as a computing process that is implemented by wireless access point 250. The operation of Wi-Fi assistance client 260 will be described in more detail below.

The quantity of devices and/or networks in environment is not limited to what is shown in FIG. 2. In practice, environment 200 may include additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

FIG. 3 is a diagram illustrating a data structure 300 that may be maintained by Wi-Fi assistance server 210. Data structure 300 may generally be used to store information relating to Wi-Fi networks implemented by wireless access points 250 of user residences 230.

As illustrated, data structure 300 may include a number of fields, including: customer identification (ID) field 310, network credentials field 320, preferred assistance technology field 330, and assistance data field 340. The fields shown for data structure 300 are examples. In alternative possible implementations, different, fewer, or additional fields may be implemented.

Customer identification field 310 may store information that identifies particular customers of a telecommunication provider that provides network access to user residences 230. The identification information may include, for example, a user account name, a telephone number associated with the user residence, an account number associated with the residence, information unique for a particular wireless access point (e.g., a media access control (MAC) value, serial number, or other value), or other identification information. In one implementation, each wireless access point 250, in use at one or more user residences 230, may be associated with an entry (e.g., a row) in data structure 300. In this situation, customer identification field 310 may include a list of identifiers associated with wireless access points.

Network credentials field 320 may store information relating to accessing a wireless network associated with corresponding customer identifier. As mentioned, the information may include a password or pre-shared key associated with the wireless network. Alternatively or additionally, the information, stored in network credentials field 320, may include a Service Set Identifier (SSID) that identifies the wireless network and/or other information associated with the wireless network.

Preferred assistance technology field 330 may include information indicating how the particular user, associated with customer ID field 320, is to be contacted. For example, a user may choose to be contacted via an SMS text message, an automated phone call, an email, a pop-up window provided by a STB, or via other techniques. In one implementation, when registering for the network assistance services, offered by Wi-Fi assistance client 260 and Wi-Fi assistance server 210, the user may indicate the method by which the user prefers to be contacted.

Assistance data field 340 may store information relating to the method by which the user prefers to be contacted. For example, assistance data field 340 may include a telephone number (for an automated telephone call or SMS message), or an email address (for contacting via email).

Three example entries are shown for data structure 300. Customer identifier field 310, for the first two records, may correspond to MAC addresses ("FA-80-32-11-23-7B" and "FC-81-00-22-44-9E", respectively) associated with wireless access points 250. Network credentials field 320, for these two records, may include corresponding passwords associated with the wireless access points ("green101" and "a32G7111", respectively). Preferred assistance technology field 330 and assistance data field 340 may indicate that the preferred message of contact is via SMS and provide telephone numbers to which the wireless network passwords are to be transmitted (e.g., 703 555 1010 and 512 555 0808). For the third illustrated entry, customer identifier field 310 may store an account login value ("jsmith") and network credentials field 320 may store a password ("a32G7111") associated with the wireless access point of the customer. Preferred assistance technology field 330 may store an indication that the customer would like to be contacted via telephone and email, and assistance data field 340 may store the customer's contact information ("512 555 1207" and "jsmith@example.com").

Figure 4:
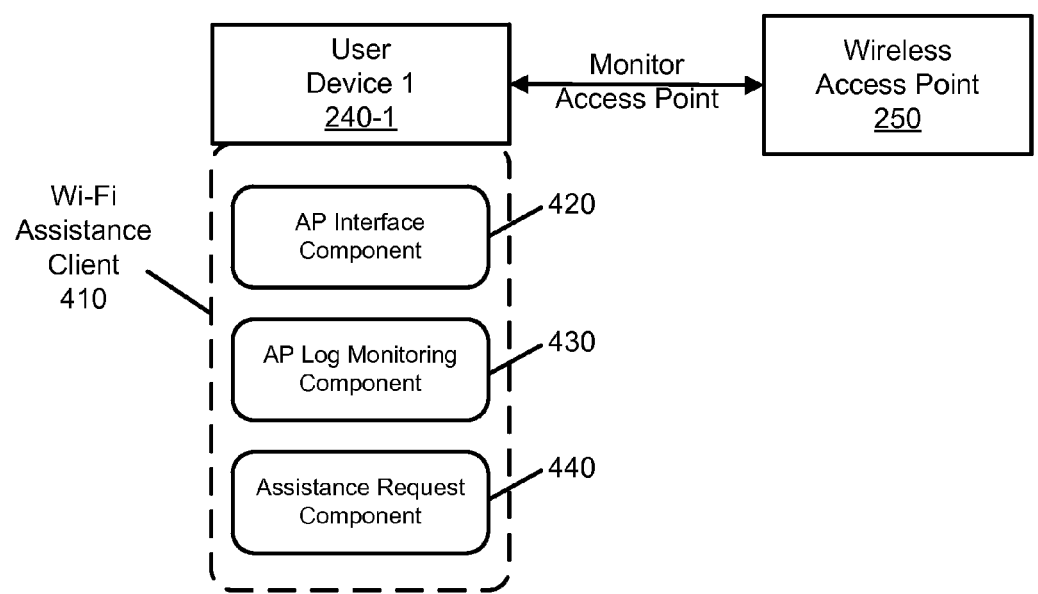
FIG. 4 is diagram that conceptually illustrates components of a user device for providing proactive assistance for a user attempting to connect a device to a wireless network, consistent with a first implementation described herein.

FIG. 4 is diagram that conceptually illustrates components of a user device, which may provide proactive assistance for a user attempting to connect a device to a wireless network, consistent with a first implementation described herein. In the implementation of FIG. 4, assume that a user device, labeled as user device 240-1, implements Wi-Fi assistance client 260, which is illustrated, for this implementation, as Wi-Fi assistance client 410. User device 240-1 may be, for example, a personal computer, a laptop computer, a STB, or some other computing device associated with user residence 230. Wi-Fi assistance client 410 may be a program that is installed by the user or by another party, such as a telecommunication company providing network connectivity to user residence 230. As illustrated, Wi-Fi assistance client 410 may include access point (AP) interface component 420, AP log monitoring component 430, and assistance request component 440.

AP interface component 420 may include logic to interact with wireless access point 250. In one implementation, wireless access point 250 may internally maintain logs relating to network connectivity requests from user devices 240. The logs may be accessed via an interface provided by wireless access point 250. The logs may include, for example, an indication of all successful and unsuccessful attempts to join the wireless network, potentially along with timestamps corresponding to the attempts.

In one implementation, wireless access point 250 may provide an HTTP interface designed to allow for configuration of wireless access point 250. In this case, AP interface component 420 may include logic to interact with the HTTP interface, such as via HTTP GET and POST requests. AP interface component 420 may be configured to, using the HTTP interface provided by wireless access point 250, obtain the log data generated by wireless access point 250. As another example, wireless access point 250 may provide another type of interface that allows external devices to configure and interact with wireless access point 250. For example, wireless access point 250 may implement an Application Programming Interface (API) that is designed to be accessed programmatically by external devices. In this case, AP interface component 420 may use the API to obtain the logs.

In one implementation, AP interface component 420 may include logic to interact with a number of different makes/models of wireless access points. For example, AP interface component 420 may include code (e.g., a computer program or script) customized for each of a number of different makes/models of wireless access points 250. AP interface component 420 may determine the make/model of the connected wireless access point 250 and accordingly select the appropriate computer program or script. In one implementation, AP interface component 420 may request log data from wireless access point 250 at regular intervals.

AP log monitoring component 430 may include logic to parse and/or analyze the logs received from wireless access point 250. In one implementation, AP log monitoring component 430 may operate to determine when the logs indicate that a user device 240 that attempted to join the wireless network, provided by wireless access point 250, was unable to join the wireless network due to incorrect entry of the network password or pre-shared key. For instance, the logs for a particular wireless access point 250 may include an entry such as "password rejected," which may indicate entry of an incorrect wireless network password. In some implementations, a certain number of failed attempts to join the wireless network, within a particular time period (e.g., three minutes), may be required before AP log monitoring component 430 generates an indication of a failed attempt to join the wireless network. For example, AP log monitoring component 430 may require at least two failed attempts, within the previous five minutes, before determining that there was a failed attempt to join the wireless network.

Assistance request component 440 may include logic to initiate the providing of a wireless network password (or other network credential information) to a user. For example, assistance request component 440 may transmit a message to Wi-Fi assistance server 210 to indicate that a failed attempt to join the wireless network has been detected. The message may include information identifying wireless access point 250 and/or information identifying user residence 230. Wi-Fi assistance server 210 may respond to the message to proactively provide assistance to the user to join their wireless network.

In some implementations, assistance request component 440, instead of contacting a remote server, such as Wi-Fi assistance server 210, may directly contact the user. For example, assistance request component 440 may directly generate a text message, instant message, email, or may place an automated telephone call. In one implementation, in which user device 240-1 includes a STB, assistance request component 440 may determine whether a television is currently being used, and if so, may provide a pop-up message to the television.

Figure 5:
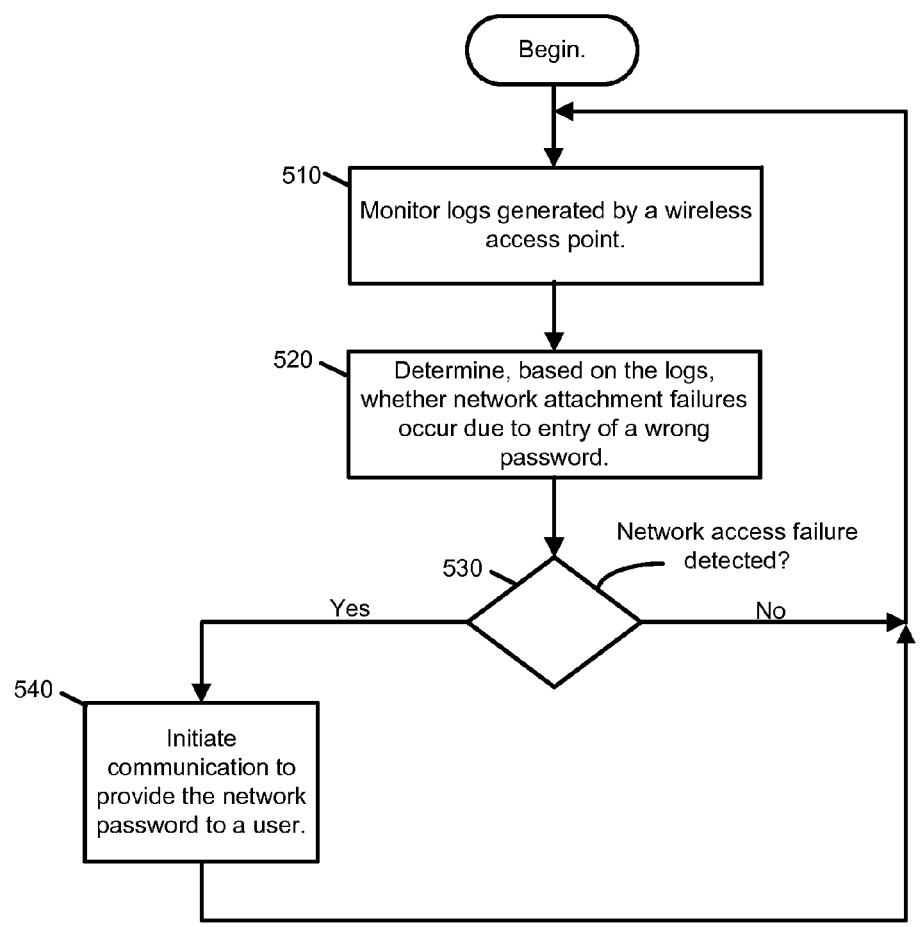
FIG. 5 is a flow chart illustrating an example of a process relating to providing proactive assistance for a user attempting to connect a device to a wireless network.

FIG. 5 is a flow chart illustrating an example of a process 500 relating to providing proactive assistance for a user attempting to connect a device to a wireless network. In one implementation, process 500 may be performed by Wi-Fi assistance client 410 (which may be implemented by user device 240-1).

Process 500 may include monitoring logs generated by a wireless access point (block 510). For example, AP interface component 420 may monitor logs generated by wireless access point 250. As mentioned, AP interface component 420 may monitor the logs generated by AP interface component 420 via, for example, an HTTP interface or another interface.

Process 500 may further include determining, based on the logs, whether network attachment failures occur due to entry of a wrong password (block 520). The determination of network access failure may be performed by AP log monitoring component 430. As previously mentioned, AP log monitoring component 430 may parse and/or analyze the monitored logs to determine when a user device is unable to join the wireless network due to incorrect entry of the network password or pre-shared key. In other implementations, AP log monitoring component 430 may detect network joining failure conditions other than entry of an incorrect password or pre-shared key.

Process 500 may further include, when network access failure is detected (block 530—Yes), initiating communication to provide the password to a user (block 540). For example, assistance request component 440 may transmit a message to Wi-Fi assistance server 210 to indicate that a failed attempt to join the wireless network has been detected. The message may include information identifying wireless access point 250 and/or information identifying user residence 230. Wi-Fi assistance server 210 may, as previously described, obtain and forward the network password to the user (e.g., via SMS, email, voice call, etc.).

When network access failure is not detected (block 530—No), process 500 may continue to monitor the logs generated by wireless access point 250 (block 510).

Figure 6:
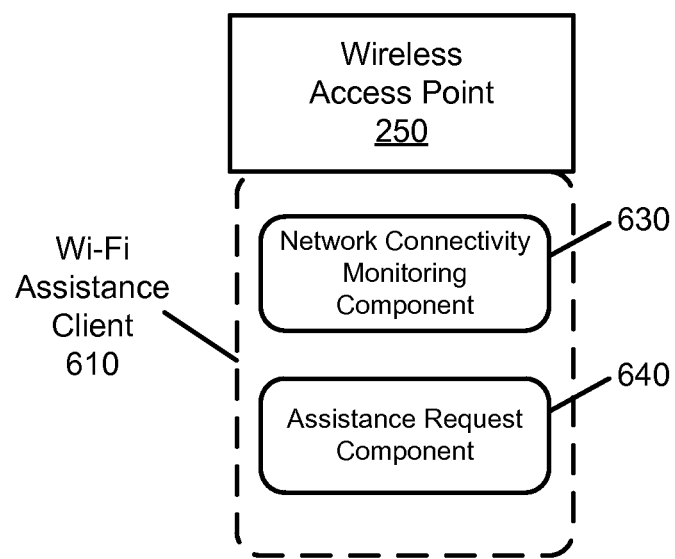
FIG. 6 is diagram that conceptually illustrates components of a user device, for providing proactive assistance for a user attempting to connect a device to a wireless network, consistent with a second implementation described herein.

FIG. 6 is diagram that conceptually illustrates components of a user device, for providing proactive assistance for a user attempting to connect a device to a wireless network, consistent with a second implementation described herein. In the implementation of FIG. 6, assume that wireless access point 250 implements Wi-Fi assistance client 260, which is illustrated, for this implementation, as Wi-Fi assistance client 610. Wi-Fi assistance client 610 may be logic that is implemented by wireless access point 250, such as an operating system level process, a firmware level process, or a higher-level process. As illustrated, Wi-Fi assistance client 610 may include network connectivity monitoring component 630 and assistance request component 640.

Network connectivity monitoring component 630 may monitor requests, from user devices 240, relating to joining the wireless network associated with wireless access point 250. In a manner similar to the operation of AP log monitoring component 430, network connectivity monitoring component 630 may operate to determine when a user device 240 attempts to join the wireless network, provided by wireless access point 250, but is unable to join due to incorrect entry of the network password or pre-shared key. In some implementations, a certain number of failed attempts to join the wireless network, within a particular time period (e.g., three minutes), may be required before network connectivity monitoring component 630 generates an indication of a failed attempt to join the wireless network.

In some implementations, network connectivity monitoring component 630 may monitor information, relating to the wireless network, such as a number of currently connected wireless devices, failed wireless connection attempts, and/or failed attempts to login to wireless access point 250. Network connectivity monitoring component may automatically determine patterns, based on this information, to identify when a user device 240 attempts to join the wireless network but is unable to join. In some implementations, connectivity monitoring component 630 may transmit this information, for analysis, to Wi-Fi assistance server 210.

Assistance request component 640 may include logic to initiate the providing of a wireless network password (or other network credential information) to a user. Assistance request component 640 may generally operate similarly to assistance request component 440. For example, assistance request component 640 may transmit a message to Wi-Fi assistance server 210 to indicate that a failed attempt to join the wireless network has been detected. The message may include information identifying wireless access point 250 and/or information identifying user residence 230. In one implementation, assistance request component 640 may use a protocol, such as the known TR-069 protocol, to communicate with Wi-Fi assistance server 210, and/or for Wi-Fi assistance server 210 may use the TR-069 protocol to control Wi-Fi assistance client 610.

Figure 7:
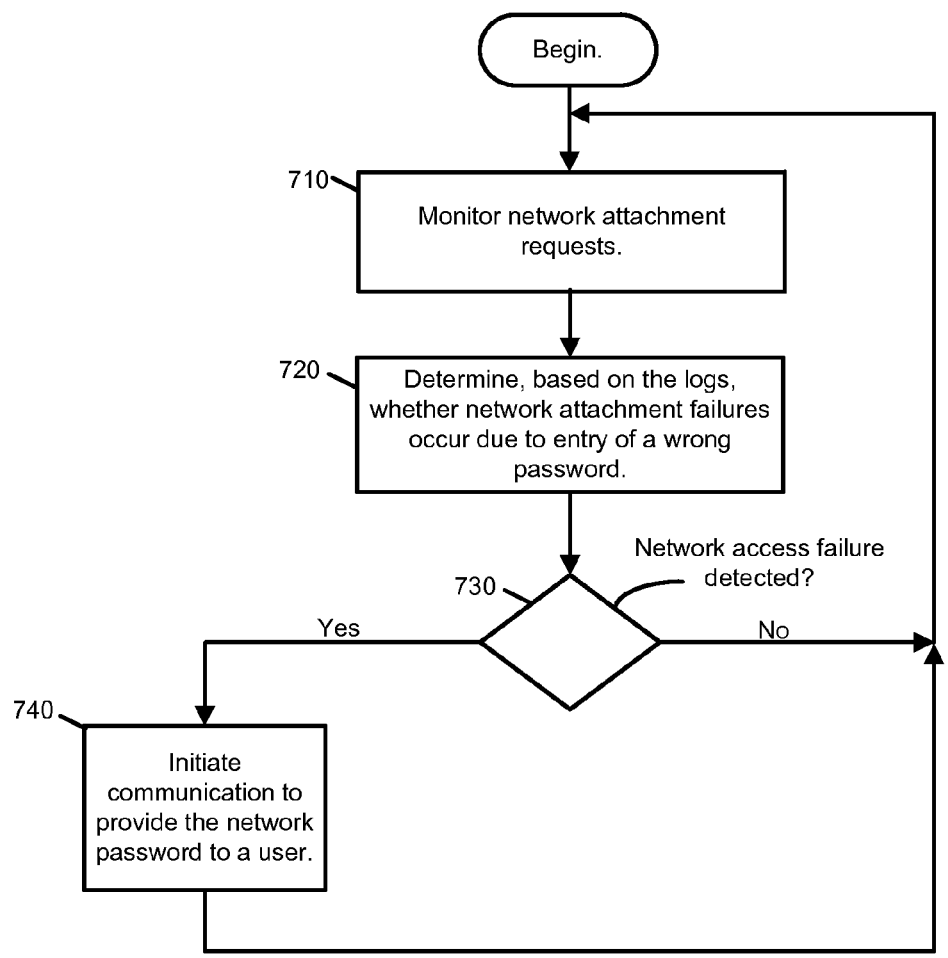
FIG. 7 is a flow chart illustrating an example of a process relating to providing proactive assistance for a user attempting to connect a device to a wireless network.

FIG. 7 is a flow chart illustrating an example of a process 700 relating to providing proactive assistance for a user attempting to connect a device to a wireless network. In one implementation, process 700 may be performed by Wi-Fi assistance client 610 (which may be implemented by wireless access point 250).

Process 700 may include monitoring network attachment requests (block 710). For example, network connectivity monitoring component 630 may monitor network attachment requests from user devices 240 to determine when attempts are made to join the wireless network but fail.

Process 700 may further include determining, based on the monitoring, occurrence of network attachment failures due to entry of a wrong password (block 720). The detection of network access failure may be performed by network connectivity monitoring component 630. As previously mentioned, network connectivity monitoring component 630 may determine when a user device is unable to join the wireless network due to incorrect entry of the network password or pre-shared key. In other implementations, network connectivity monitoring component 630 may detect network joining failure conditions other than entry of an incorrect password or pre-shared key.

Process 700 may further include, when network access failure is detected (block 730—Yes), initiating communication to provide the network password to a user (block 740). For example, assistance request component 640 may transmit a message to Wi-Fi assistance server 210 to indicate that a failed attempt to join the wireless network has been detected. The message may include information identifying wireless access point 250 and/or information identifying user residence 230. Wi-Fi assistance server 210 may, as previously described, obtain and forward the network password to the user (e.g., via SMS, email, voice call, etc.).

When network access failure is not detected (block 730—No), process 700 may continue to monitor the network attachment requests (block 710).

As described above, one or more attempts to join a wireless network, such as a Wi-Fi network implemented a user residence 230, may be proactively detected and the network password for the wireless network may be transmitted to the user.

Figure 8:
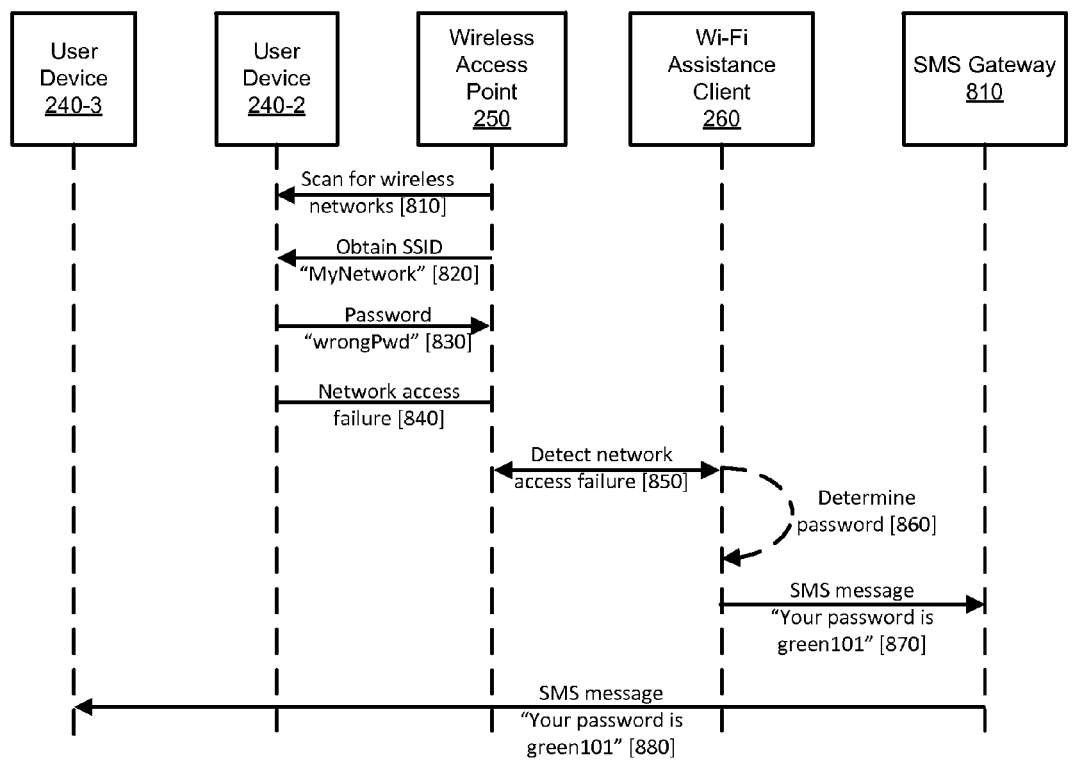
FIG. 8 illustrates a signal flow diagram of example operations, consistent with another implementation, to proactively assist a user attempting to connect a device to a wireless network.

FIG. 8 illustrates a signal flow diagram of example operations, consistent with another implementation, to proactively assist a user in obtaining a wireless network connection. As shown in FIG. 8, assume that a user is trying to connect a user device 240-2 to a Wi-Fi wireless network implemented by wireless access point 250. Another user device, illustrated as user device 240-3, may include a mobile device (e.g., smart phone) that is carried by the user. Wi-Fi assistance client 260 may be implemented in a manner similar to the manner described with respect to FIG. 4 or FIG. 6. Additionally, SMS gateway 810 is illustrated. SMS gateway 810 may include one or more computing devices that enable computing devices to send and receive SMS transmissions to or from a telecommunications network (e.g., network 220).

Assume user device 240-2 initially scans for wireless networks within range of user device 240-2 (at 810). User device 240-2 may locate the wireless network "MyNetwork," which may correspond to the wireless network broadcast by wireless access point 250 (at 820). The user may, however, not correctly remember the password for the wireless network may enter the incorrect network password "wrongPwd" (at 830), which may result in a failure of user device 240-2 to obtain network access from wireless access point 250 (at 840).

Wi-Fi assistance client 260 may detect the network access failure (at 850). For example, as described above, in response, Wi-Fi assistance client 260 may determine the user's network password (such as by maintaining a data structure similar to data structure 300) (at 860), and may initiate sending of a message, such as an SMS message, to user device 240-3 (at 870). SMS gateway 810 may forward the message, including the network password, to user device 240-3 (at 880). The user may thus receive the text message, notice the correct network password, and enter the correct network password at user device 240-2.

Figure 9:
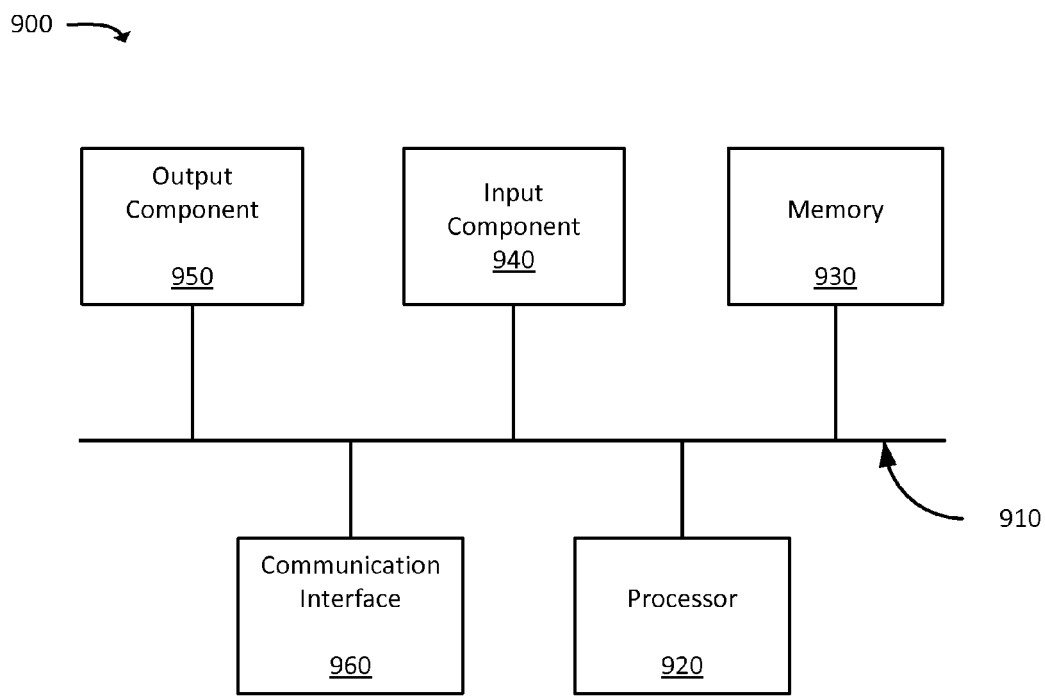
FIG. 9 is a diagram of example components of a device.

FIG. 9 is a diagram of example components of device 900. One or more of the devices described above (e.g., with respect to FIGS. 1A, 1B, 2, 4, 6, and/or 8) may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes (LEDs), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared (IR) receiver, a Bluetooth radio, a cellular radio transceiver, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 5 and 7, the order of the blocks may be modified in other implementations. Further, non-dependent blocks may be performed in parallel. Additionally, while a series of signals has been described with regard to FIG. 8, the order of the signals may be modified in other implementations. Also, non-dependent signals may be sent and/or received in parallel. In some implementations, additional signals may be transmitted before, after, or in between the described signals.

Additionally, while examples of a data structure is illustrated in FIG. 3 as including certain types of information, in practice, these data structures may store additional, fewer, different, or differently arranged types of information than shown in these figures. Furthermore, while these data structures are shown as tables, in practice, these data structures may take the form of any other type of data structure, such as an array, a linked list, a hash table, a tree, and/or any other type of data structure.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   monitoring, by a computing device associated with a user of a residence that obtains network connectivity from a telecommunications provider, a wireless access point that provides a wireless network at the residence of the user, the monitoring including:
      obtaining, by the computing device, operational logs of the wireless access point via an interface with the wireless access point, the interface being implemented over the wireless network at the residence of the user;
   identifying, by the computing device and based on the monitoring of the operational logs, a failed attempt to attach to the wireless network due to entry of an incorrect network password; and
   causing, by a network device associated with the telecommunications provider and based on the identification of the failed attempt to attach to the wireless network, transmission of a correct password for the wireless network to a mobile device associated with the user.

2. The method of claim 1, wherein causing the transmission of the correct password further comprises:
   determining, based on information identifying the wireless access point or the user, the correct password;
   determining information relating to contacting the mobile device; and
   transmitting, based on the information relating to contacting the mobile device, the correct password.

3. The method of claim 2, wherein transmitting the correct password includes:
   transmitting a Short Message Service (SMS) message to the mobile device;
   placing an automated telephone call to the mobile device; or
   sending an email to an email address account associated with the account.

4. The method of claim 1, wherein monitoring the wireless access point additionally includes:
   analyzing the operational logs to obtain the indication of a failed attempt to attach to the wireless network.

5. The method of claim 4, wherein the interface with the wireless access point includes a hypertext transfer protocol (HTTP) interface or an application program interface (API).

6. The method of claim 1, wherein identifying the failed attempt to attach to the wireless network further includes:
   determining that at least a threshold number of incorrect passwords have been entered in attempting to attach to the wireless network.

7. The method of claim 1, wherein the wireless network includes a short range wireless network.

8. The method of claim 1, wherein the failed attempt to attach to the wireless network is made from a second computing device, and wherein the computing device, the second computing device, and the network device are different from one another.

9. A device associated with a user of a residence that obtains network connectivity from a telecommunications provider, the device comprising:
   a non-transitory memory device storing:
      a plurality of processor-executable instructions; and one or more processors to execute the processor-executable instructions, wherein executing the processor-executable instructions causes the one or more processors to:
  monitor network access requests to attach to a wireless network, at the residence of the user, provided by a wireless router, the monitoring of the network access requests including:
    obtaining operational logs of the wireless router via an interface with the wireless router, the interface being implemented over the wireless network at the residence of the user;
  identify, based on the monitoring of the operational logs, a failed attempt to attach to the wireless network due to entry of an incorrect network password;
  determine, based on the identification of the failed attempt to attach to the wireless network, a correct password for the wireless network; and
  initiate transmission of a message to a mobile device of the user, the message including the correct password.

10. The device of claim 9, wherein the message includes a text message or an automated telephone call.

11. The device of claim 9, wherein the wireless network includes a short range wireless network.

12. The device of claim 9, wherein when initiating the transmission of the message to the mobile device, the processor-executable instructions further include instructions, when executed by the one or more processors, to:
  transmit a message, identifying the wireless router, to a remote server.

13. The device of claim 9, wherein the device includes a user device connected to the wireless router, and wherein the plurality of processor-executable instructions further include instructions, that when executed by the one or more processors, cause the one or more processors to:
  analyzing the operational logs to obtain the indication of the failed attempt to attach to the wireless network.

14. The device of claim 13, wherein the interface with the wireless router includes a hypertext transfer protocol (HTTP) interface or an application program interface (API).

15. The device of claim 9, wherein when initiating the transmission of the message to the mobile device, the processor-executable instructions further include instructions to cause the one or more processors to:
  directly transmit the message to the mobile device.

16. The device of claim 9, wherein the failed attempt to attach to the wireless network is made from another device, and wherein the device and the another device are different from one another.

17. A non-transitory computer readable medium storing a plurality of processor-executable instructions, which, when executed by one or more processors, cause the one or more processors to:
  monitor, at a computing device associated with a user of a residence that obtains network connectivity from a telecommunications provider, a wireless access point that provides a wireless network at the residence of the user, the monitoring including:
    obtaining, by the computing device, operational logs of the wireless access point via an interface with the wireless access point, the interface being implemented over the wireless network at the residence of the user;
  identify, based on the monitoring of the operational logs, a failed attempt to attach to the wireless network due to entry of an incorrect network password; and
  cause, based on the identification of the failed attempt to attach to the wireless network, transmission of a correct password for the wireless network, to a mobile device associated with the user.

18. The non-transitory computer readable medium of claim 17, wherein the plurality of processor-executable instructions additionally include instructions, that when executed by the one or more processors, cause the one or more processors to:
  determine, based on information identifying the wireless access point or the user, the correct password;
  determine information relating to contacting the mobile device; and
  transmit, based on the information relating to contacting the mobile device, the correct password.

19. The non-transitory computer readable medium of claim 18, wherein the plurality of processor-executable instructions additionally include instructions, that when executed by the one or more processors, cause the one or more processors to:
  transmit a Short Message Service (SMS) message to the mobile device;
  place an automated telephone call to the mobile device; or
  send an email to an email address account associated with the account.

20. The non-transitory computer readable medium of claim 17, wherein the plurality of processor-executable instructions additionally include instructions, that when executed by the one or more processors, cause the one or more processors to:
  analyze the operational logs to obtain the indication of a failed attempt to attach to the wireless network.

\* \* \* \* \*